Patented Mar. 24, 1931

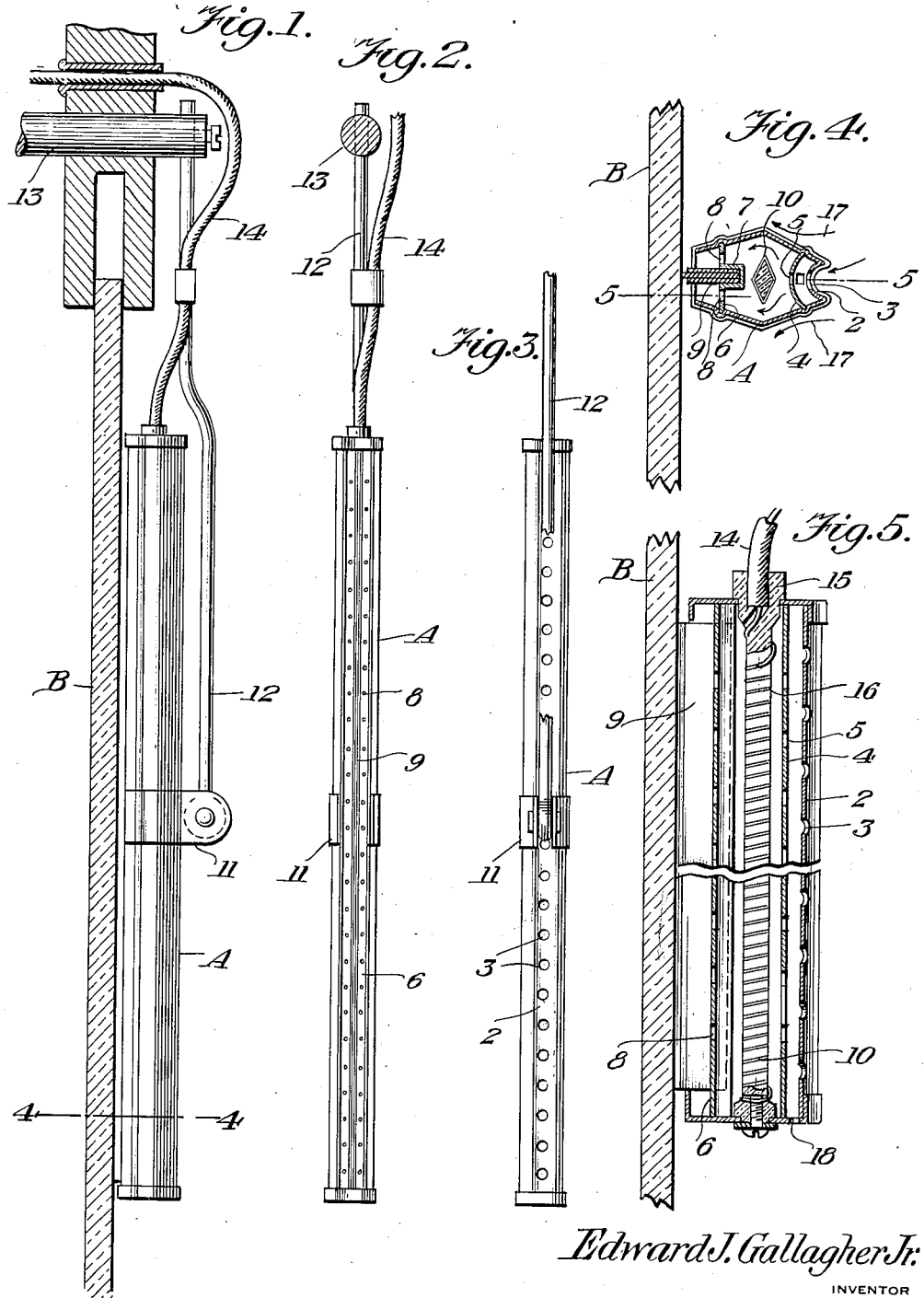

1,798,018

UNITED STATES PATENT OFFICE

EDWARD J. GALLAGHER, JR., OF BALTIMORE, MARYLAND

WINDSHIELD WIPER

Application filed July 20, 1929. Serial No. 379,832.

This invention relates to a wiper for use on the windshields of motor vehicles, boats, aircrafts and on windows for trains, street cars, etc., the general object of the invention being to make the wiper element in the form of a housing which has an opening in that edge which lies close to the transparent member to be wiped, with means whereby air can enter the housing from the other edge and pass through the housing and contact the transparent member and means for heating the air as it passes through the housing so that the heated air will melt snow and ice and evaporate moisture on the transparent member as the element is moved over the same.

A further object of the invention is to provide means for holding a wiper strip in the housing, with one edge projecting therefrom so that this strip will engage the transparent member and wipe the same in the usual manner.

A further object of the invention is to so form the exterior of the housing that it will deflect the air striking the same so that this air will not interfere with the heated air passing from the housing against the transparent member.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is a sectional view through the windshield of a vehicle, showing the invention in use, the device being shown in elevation.

Figure 2 is a view of the inner edge or end of the device.

Figure 3 is a view of the opposite end or edge.

Figure 4 is a section on line 4—4 of Figure 1.

Figure 5 is a section on line 5—5 of Figure 4.

As shown in these views, the wiper element A is made in the form of a housing, with its sides sloping from the center toward the edges, with its inner edge open and its outer edge formed of a concaved plate or part 2 which is provided with a longitudinal row of perforations 3. A partition plate 4, of curved shape in cross section, is arranged in the outer part of the housing and is spaced from the part 2 and this plate is formed with a longitudinal row of openings 5 which are preferably staggered in relation to the openings 3. A partition plate 6 is also arranged in the housing an appreciable distance from the inner edge thereof, and this plate is formed with an inwardly extending channel 7 and two rows of perforations 8, the rows of perforations being arranged at opposite sides of the channel. This channel holds a wiper strip 9 which projects through the open edge of the housing so that it will contact the transparent member B without the inner edge of the housing contacting said transparent member.

An electric heating element 10 is arranged in the space between the partitions 4 and 6 and is preferably of diamond shape, as shown, so as to divide the streams of air passing into the housing through the perforations 3 and 5 into two parts, as shown by the arrows in Figure 4, and then this heated air will pass through the perforations 8 and pass from the housing on both sides of the wiper strip and thus contact the transparent member so as to melt snow and ice and evaporate moisture on the transparent member.

A clip 11 is fastened to the housing at approximately the center thereof, and this clip is pivotally connected to the wiper arm 12, the upper end of which is connected with the usual shaft 13 which is connected with a motor or handle so that the wiper device can be oscillated over the transparent member. A conductor 14 is connected with the upper end of the housing by a plug 15 of insulating material placed in said upper end, and this conductor is connected with the coils 16 of the element 10. These coils may be grounded on the housing. The conductor may be attached to the battery of the car or to any other source of electrical supply.

From the foregoing it will be seen that I have provided a simple form of wiper for removing snow, ice and moisture from the transparent member by means of air entering the outer edge of the housing and being heated therein by the heater element 10, after which the air passes from the housing against the transparent member. By making the housing of the shape shown, the air not entering the housing is deflected as shown by the arrows 17, away from the inner edge of the housing so that this outside air will not interfere with the action of the heated air on the windshield. By making the outer edge of the housing of concaved shape, a pocket or groove is formed, which acts to catch the air and cause it to pass through the perforations 3 into the housing.

One or more holes 18 are formed in the bottom of the device in front of the partition 4 to drain any water collecting in this part of the device, due to snow or rain entering the device or from any condensation therein, so that moisture will not come in contact with the heating coil.

The chamber formed by the front wall 2 and the partition 4 receives the air coming into the device and this air is heated by the heat imparted to the walls of the chamber by the heating element 10, so that the air is preheated before reaching the heating chamber containing the heating element. The air passing into the device through the perforations 3 will be heated by the electric heating element and will escape through the perforations 8 on each side of the wiper strip, and as it strikes the transparent member, on each side of the wiper strip, it will not only remove snow, ice and moisture therefrom, but will also act to remove dirt, etc., thus keeping the transparent member clean under all weather conditions.

The perforations 8 on each side of the wiper strip give the heated air practically an unobstructed passage, as the wiper strip or pad oscillates over the transparent member.

Of course, the device can be used on the inside of the transparent member, if desired.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:—

1. A wiper device of the class described comprising a housing having an elongated opening in its rear wall and perforations in its front wall whereby air can enter the housing through said perforations and escape against a transparent member through the opening and, means within the housing for heating the air as it passes through the same and a wiper strip carried by the rear part of the housing for engaging the transparent member.

2. A wiper device of the class described comprising a flattened, hollow housing having its inner edge open and its outer edge formed with a groove therein, with perforations in the grooved portion whereby air will enter the housing through said perforations, a curved partition in the housing adjacent the grooved portion and having perforations therein, an electric heating element in the housing against which the air passing through the perforations in the partition will strike, a second partition in the housing located an appreciable distance from the open end thereof, said second partition having a channel formed therein, a wiper strip held in the channel, with a portion projecting through the open edge of the housing to contact the transparent member, said second partition having a row of perforations therein on each side of the channel portion whereby the heated air can escape through the open edge of the housing against the transparent member and means for moving the housing over a part of the transparent member.

In testimony whereof I affix my signature.

EDWARD J. GALLAGHER, Jr.